United States Patent
Morgan et al.

(10) Patent No.: US 10,902,406 B1
(45) Date of Patent: Jan. 26, 2021

(54) VERIFYING PROXIMITY DURING PAYMENT TRANSACTIONS

(71) Applicant: Square, Inc., San Francisco, CA (US)

(72) Inventors: Timothy Ben Morgan, San Francisco, CA (US); Vanessa Erica Slavich, San Francisco, CA (US); Brielle Alyse Rajkovich, San Francisco, CA (US); Mathew Wilson, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 299 days.

(21) Appl. No.: 15/947,016

(22) Filed: Apr. 6, 2018

Related U.S. Application Data

(63) Continuation of application No. 13/829,658, filed on Mar. 14, 2013, now Pat. No. 9,940,616.

(51) Int. Cl.
*G06Q 20/32* (2012.01)
*G06Q 20/40* (2012.01)

(52) U.S. Cl.
CPC .................. *G06Q 20/327* (2013.01)

(58) Field of Classification Search
CPC ........................................... G06F 21/35
USPC ............................................. 705/65
See application file for complete search history.

(56) References Cited

U.S. PATENT DOCUMENTS

| | | | |
|---|---|---|---|
| 3,854,036 A | 12/1974 | Gupta et al. | |
| 4,035,614 A | 7/1977 | Frattarola et al. | |
| 4,254,441 A | 3/1981 | Fisher | |
| 4,591,937 A | 5/1986 | Nakarai et al. | |
| 4,788,420 A | 11/1988 | Chang et al. | |
| 4,845,740 A | 7/1989 | Tokuyama et al. | |
| 5,173,597 A | 12/1992 | Anglin | |

(Continued)

FOREIGN PATENT DOCUMENTS

| | | |
|---|---|---|
| CA | 2 841 267 A1 | 1/2013 |
| JP | 2001-313714 A | 11/2001 |

(Continued)

OTHER PUBLICATIONS

Final Office Action dated May 2, 2019, for U.S. Appl. No. 15/393,685, of Lewis, J., et al., filed Dec. 29, 2016.

(Continued)

*Primary Examiner* — Clifford B Madamba
(74) *Attorney, Agent, or Firm* — Mattingly & Malur, PC

(57) ABSTRACT

In some examples, a system receives, from a first device, an indication of a location of the first device and a notification of a transaction including an identifier that identifies both a customer and a second device associated with the customer. The system may send information related to the notification to cause the second device to present details related to the transaction. The system may receive, from the second device, an indication of a location of the second device, and may determine that the first device is in proximity to the second device by comparing the location of the first device to the location of the second device. The system may submit, to a payment processor, information related to the transaction and the determination of proximity for authentication to enable the payment processor to determine whether to approve the transaction based at least on the determination of proximity.

20 Claims, 8 Drawing Sheets

(56) References Cited

U.S. PATENT DOCUMENTS

| | | |
|---|---|---|
| 5,266,789 A | 11/1993 | Anglin et al. |
| 5,434,400 A | 7/1995 | Scherzer |
| 5,463,678 A | 10/1995 | Kepley, III et al. |
| 5,589,855 A | 12/1996 | Blumstein et al. |
| 5,652,421 A | 7/1997 | Veeneman et al. |
| 5,679,943 A | 10/1997 | Schultz et al. |
| 5,764,742 A | 6/1998 | Howard et al. |
| 5,850,599 A | 12/1998 | Seiderman |
| 5,878,337 A | 3/1999 | Joao et al. |
| 5,945,654 A | 8/1999 | Huang |
| 5,991,749 A | 11/1999 | Morrill, Jr. |
| 6,006,109 A | 12/1999 | Shin |
| 6,021,944 A | 2/2000 | Arakaki |
| 6,032,859 A | 3/2000 | Muehlberger et al. |
| 6,061,666 A | 5/2000 | Do et al. |
| 6,129,277 A | 10/2000 | Grant et al. |
| 6,234,389 B1 | 5/2001 | Valliani et al. |
| 6,330,544 B1 | 12/2001 | Walker et al. |
| 6,341,353 B1 | 1/2002 | Herman et al. |
| 6,363,139 B1 | 3/2002 | Zurek et al. |
| 6,400,517 B1 | 6/2002 | Murao |
| 6,431,445 B1 | 8/2002 | DeLand et al. |
| 6,476,743 B1 | 11/2002 | Brown et al. |
| 6,481,623 B1 | 11/2002 | Grant et al. |
| 6,536,670 B1 | 3/2003 | Postman et al. |
| 6,579,728 B2 | 6/2003 | Grant et al. |
| 6,612,488 B2 | 9/2003 | Suzuki |
| 6,813,608 B1 | 11/2004 | Baranowski |
| 6,832,721 B2 | 12/2004 | Fujii |
| 6,850,147 B2 | 2/2005 | Prokoski et al. |
| 6,868,391 B1 | 3/2005 | Hultgren |
| 6,896,182 B2 | 5/2005 | Sakaguchi |
| 6,898,598 B2 | 5/2005 | Himmel et al. |
| 6,944,782 B2 | 9/2005 | von Mueller et al. |
| 7,003,316 B1 | 2/2006 | Elias et al. |
| 7,013,149 B2 | 3/2006 | Vetro et al. |
| 7,149,296 B2 | 12/2006 | Brown et al. |
| 7,167,711 B1 | 1/2007 | Dennis |
| 7,252,232 B2 | 8/2007 | Fernandes et al. |
| 7,309,012 B2 | 12/2007 | von Mueller et al. |
| 7,324,836 B2 | 1/2008 | Steenstra et al. |
| 7,363,054 B2 | 4/2008 | Elias et al. |
| 7,376,431 B2 | 5/2008 | Niedermeyer |
| 7,409,234 B2 | 8/2008 | Glezerman |
| 7,433,452 B2 | 10/2008 | Taylor et al. |
| 7,493,390 B2 | 2/2009 | Bobde et al. |
| 7,506,812 B2 | 3/2009 | von Mueller et al. |
| 7,520,430 B1 | 4/2009 | Stewart et al. |
| 7,575,166 B2 | 8/2009 | McNamara |
| 7,581,678 B2 | 9/2009 | Narendra et al. |
| 7,600,673 B2 | 10/2009 | Stoutenburg et al. |
| 7,703,676 B2 | 4/2010 | Hart et al. |
| 7,707,089 B1 | 4/2010 | Barton et al. |
| 7,708,189 B1 | 5/2010 | Cipriano |
| 7,752,135 B2 | 7/2010 | Brown et al. |
| 7,757,953 B2 | 7/2010 | Hart et al. |
| 7,764,185 B1 | 7/2010 | Manz et al. |
| 7,793,834 B2 | 9/2010 | Hachey et al. |
| 7,810,729 B2 | 10/2010 | Morley |
| 7,869,591 B1 | 1/2011 | Nagel et al. |
| 7,896,248 B2 | 3/2011 | Morley |
| 7,918,394 B1 | 4/2011 | Morley, Jr. |
| 8,011,587 B2 | 9/2011 | Johnson et al. |
| 8,112,066 B2 * | 2/2012 | Ben Ayed .......... H04L 63/0492 455/411 |
| 8,231,055 B2 | 7/2012 | Wen |
| 8,266,551 B2 | 9/2012 | Boldyrev et al. |
| 8,336,771 B2 | 12/2012 | Tsai et al. |
| 8,376,239 B1 | 2/2013 | Humphrey |
| 8,413,901 B2 | 4/2013 | Wen |
| 8,500,010 B1 | 8/2013 | Marcus et al. |
| 8,560,823 B1 | 10/2013 | Aytek et al. |
| 8,571,989 B2 | 10/2013 | Dorsey et al. |
| 8,573,487 B2 | 11/2013 | McKelvey |
| 8,573,489 B2 | 11/2013 | Dorsey et al. |
| 8,584,946 B2 | 11/2013 | Morley |
| 8,602,305 B2 | 12/2013 | Dorsey et al. |
| 8,612,352 B2 | 12/2013 | Dorsey et al. |
| 8,615,445 B2 | 12/2013 | Dorsey et al. |
| 8,630,586 B2 | 1/2014 | Dvortsov et al. |
| 8,635,117 B1 | 1/2014 | Acuna-Rohter |
| 8,640,953 B2 | 2/2014 | Dorsey et al. |
| 8,676,119 B2 | 3/2014 | Cohen et al. |
| 8,678,277 B2 | 3/2014 | Dorsey et al. |
| 8,701,996 B2 | 4/2014 | Dorsey et al. |
| 8,701,997 B2 | 4/2014 | Dorsey et al. |
| 8,763,900 B2 | 7/2014 | Marcus et al. |
| 8,794,517 B1 | 8/2014 | Templeton et al. |
| 8,832,806 B2 * | 9/2014 | Ozzie ................ G06Q 20/4014 726/5 |
| 8,855,312 B1 | 10/2014 | Hodgman et al. |
| 8,859,337 B2 | 10/2014 | Gaul et al. |
| 8,990,121 B1 | 3/2015 | Guise et al. |
| 9,075,979 B1 * | 7/2015 | Queru ............... H04W 12/0605 |
| 9,569,767 B1 | 2/2017 | Lewis et al. |
| 9,805,370 B1 | 10/2017 | Quigley et al. |
| 9,911,116 B1 | 3/2018 | Lewis et al. |
| 9,940,616 B1 | 4/2018 | Morgan et al. |
| 10,198,731 B1 | 2/2019 | Spindel et al. |
| 10,504,093 B1 | 12/2019 | Lewis et al. |
| 10,692,088 B1 | 6/2020 | Spindel et al. |
| 2002/0002507 A1 | 1/2002 | Hatakeyarna |
| 2002/0030871 A1 | 3/2002 | Anderson et al. |
| 2002/0077974 A1 | 6/2002 | Ortiz |
| 2002/0091646 A1 | 7/2002 | Lake et al. |
| 2002/0108062 A1 | 8/2002 | Nakajima et al. |
| 2002/0165462 A1 | 11/2002 | Westbrook et al. |
| 2002/0188535 A1 | 12/2002 | Chao et al. |
| 2003/0089772 A1 | 5/2003 | Chien |
| 2003/0132300 A1 | 7/2003 | Dilday et al. |
| 2003/0144040 A1 | 7/2003 | Liu et al. |
| 2003/0204447 A1 | 10/2003 | Dalzell et al. |
| 2004/0012875 A1 | 1/2004 | Wood |
| 2004/0033726 A1 | 2/2004 | Kao |
| 2004/0041911 A1 | 3/2004 | Odagiri et al. |
| 2004/0093496 A1 | 5/2004 | Colnot |
| 2004/0104268 A1 | 6/2004 | Bailey |
| 2004/0127256 A1 | 7/2004 | Goldthwaite et al. |
| 2004/0128256 A1 | 7/2004 | Krouse et al. |
| 2004/0151026 A1 | 8/2004 | Naso et al. |
| 2004/0197489 A1 | 10/2004 | Heuser et al. |
| 2004/0204074 A1 | 10/2004 | Desai |
| 2005/0077870 A1 | 4/2005 | Ha et al. |
| 2005/0156037 A1 | 7/2005 | Wurzburg |
| 2005/0156038 A1 | 7/2005 | Wurzburg et al. |
| 2005/0194452 A1 | 9/2005 | Nordentoft et al. |
| 2005/0242173 A1 | 11/2005 | Suzuki |
| 2006/0000917 A1 | 1/2006 | Kim et al. |
| 2006/0094481 A1 | 5/2006 | Gullickson |
| 2006/0122902 A1 | 6/2006 | Petrov et al. |
| 2006/0152276 A1 | 7/2006 | Barksdale |
| 2006/0208066 A1 | 9/2006 | Finn et al. |
| 2006/0223580 A1 | 10/2006 | Antonio et al. |
| 2006/0234771 A1 | 10/2006 | Shavrov |
| 2006/0271497 A1 | 11/2006 | Cullen et al. |
| 2007/0063048 A1 | 3/2007 | Havens et al. |
| 2007/0067833 A1 | 3/2007 | Colnot |
| 2007/0100651 A1 | 5/2007 | Ramer et al. |
| 2007/0150387 A1 | 6/2007 | Seubert et al. |
| 2007/0155430 A1 | 7/2007 | Cheon et al. |
| 2007/0174080 A1 | 7/2007 | Outwater |
| 2007/0203836 A1 | 8/2007 | Dodin |
| 2007/0208930 A1 | 9/2007 | Blank et al. |
| 2007/0221728 A1 | 9/2007 | Ferro et al. |
| 2007/0244811 A1 | 10/2007 | Tumminaro |
| 2007/0250623 A1 | 10/2007 | Hickey et al. |
| 2007/0255620 A1 | 11/2007 | Tumminaro et al. |
| 2007/0255653 A1 | 11/2007 | Tumminaro et al. |
| 2008/0027815 A1 | 1/2008 | Johnson et al. |
| 2008/0035725 A1 * | 2/2008 | Jambunathan ......... G06Q 20/40 235/380 |
| 2008/0037442 A1 | 2/2008 | Bill |
| 2008/0040274 A1 | 2/2008 | Uzo |
| 2008/0059370 A1 | 3/2008 | Sada et al. |

(56) References Cited

U.S. PATENT DOCUMENTS

| | | |
|---|---|---|
| 2008/0059375 A1 | 3/2008 | Abifaker |
| 2008/0177624 A9 | 7/2008 | Dohse |
| 2008/0177662 A1 | 7/2008 | Smith et al. |
| 2008/0197188 A1 | 8/2008 | Jagatic et al. |
| 2008/0238610 A1 | 10/2008 | Rosenberg |
| 2008/0249939 A1 | 10/2008 | Veenstra |
| 2008/0296978 A1 | 12/2008 | Finkenzeller et al. |
| 2009/0068982 A1 | 3/2009 | Chen et al. |
| 2009/0094126 A1 | 4/2009 | Killian et al. |
| 2009/0098908 A1 | 4/2009 | Silverbrook et al. |
| 2009/0104920 A1 | 4/2009 | Moon et al. |
| 2009/0117883 A1 | 5/2009 | Coifing et al. |
| 2009/0119190 A1 | 5/2009 | Realini |
| 2009/0159681 A1 | 6/2009 | Mullen et al. |
| 2010/0063893 A1 | 3/2010 | Townsend |
| 2010/0076777 A1 | 3/2010 | Paretti et al. |
| 2010/0184479 A1 | 7/2010 | Griffin |
| 2010/0243732 A1 | 9/2010 | Wallner |
| 2010/0269059 A1 | 10/2010 | Olthmer et al. |
| 2010/0287030 A1 | 11/2010 | Sinha et al. |
| 2010/0332339 A1 | 12/2010 | Patel et al. |
| 2010/0332400 A1 | 12/2010 | Etchegoyen |
| 2011/0053560 A1 | 3/2011 | Jain et al. |
| 2011/0055084 A1 | 3/2011 | Singh |
| 2011/0084131 A1 | 4/2011 | McKelvey |
| 2011/0084139 A1 | 4/2011 | McKelvey et al. |
| 2011/0084147 A1 | 4/2011 | Wilson et al. |
| 2011/0137803 A1 | 6/2011 | Willins |
| 2011/0161235 A1 | 6/2011 | Beenau et al. |
| 2011/0198395 A1 | 8/2011 | Chen |
| 2011/0202463 A1 | 8/2011 | Powell |
| 2011/0251892 A1 | 10/2011 | Laracey |
| 2011/0258120 A1 | 10/2011 | Weiss |
| 2011/0258689 A1 | 10/2011 | Cohen et al. |
| 2011/0302019 A1 | 12/2011 | Proctor, Jr. et al. |
| 2012/0005039 A1 | 1/2012 | Dorsey et al. |
| 2012/0008851 A1 | 1/2012 | Pennock et al. |
| 2012/0011071 A1 | 1/2012 | Pennock et al. |
| 2012/0012653 A1 | 1/2012 | Johnson et al. |
| 2012/0030116 A1 | 2/2012 | Shirey et al. |
| 2012/0052910 A1 | 3/2012 | Mu et al. |
| 2012/0061467 A1 | 3/2012 | Tang et al. |
| 2012/0084203 A1 | 4/2012 | Mehew et al. |
| 2012/0095869 A1 | 4/2012 | McKelvey |
| 2012/0095871 A1 | 4/2012 | Dorsey et al. |
| 2012/0095906 A1 | 4/2012 | Dorsey et al. |
| 2012/0095907 A1 | 4/2012 | Dorsey et al. |
| 2012/0095916 A1 | 4/2012 | Dorsey et al. |
| 2012/0097739 A1 | 4/2012 | Babu et al. |
| 2012/0110568 A1 | 5/2012 | Abel et al. |
| 2012/0118956 A1 | 5/2012 | Lamba et al. |
| 2012/0118959 A1 | 5/2012 | Sather et al. |
| 2012/0118960 A1 | 5/2012 | Sather et al. |
| 2012/0126005 A1 | 5/2012 | Dorsey et al. |
| 2012/0126006 A1 | 5/2012 | Dorsey et al. |
| 2012/0126007 A1 | 5/2012 | Lamba et al. |
| 2012/0126010 A1 | 5/2012 | Babu et al. |
| 2012/0126011 A1 | 5/2012 | Lamba et al. |
| 2012/0126012 A1 | 5/2012 | Lamba et al. |
| 2012/0126013 A1 | 5/2012 | Sather et al. |
| 2012/0126014 A1 | 5/2012 | Sather et al. |
| 2012/0130903 A1 | 5/2012 | Dorsey et al. |
| 2012/0132712 A1 | 5/2012 | Babu et al. |
| 2012/0138683 A1 | 6/2012 | Sather et al. |
| 2012/0168505 A1 | 7/2012 | Sather et al. |
| 2012/0209773 A1 | 8/2012 | Ranganathan |
| 2012/0234918 A1 | 9/2012 | Lindsay |
| 2012/0244885 A1 | 9/2012 | Hefetz |
| 2012/0246074 A1 | 9/2012 | Annamalai et al. |
| 2012/0259651 A1 | 10/2012 | Mallon et al. |
| 2012/0270528 A1 | 10/2012 | Goodman |
| 2012/0278727 A1 | 11/2012 | Ananthakrishnan et al. |
| 2012/0323685 A1 | 12/2012 | Ullah |
| 2012/0330840 A1 | 12/2012 | Stinchcombe |
| 2013/0006773 A1 | 1/2013 | Lutnick et al. |
| 2013/0024341 A1 | 1/2013 | Jeon et al. |
| 2013/0031003 A1 | 1/2013 | Dorsey et al. |
| 2013/0031004 A1 | 1/2013 | Dorsey et al. |
| 2013/0050080 A1 | 2/2013 | Dahl et al. |
| 2013/0065672 A1 | 3/2013 | Gelman et al. |
| 2013/0066783 A1 | 3/2013 | Wolff |
| 2013/0087614 A1 | 4/2013 | Limtao et al. |
| 2013/0103946 A1 | 4/2013 | Binenstock |
| 2013/0124333 A1 | 5/2013 | Doughty et al. |
| 2013/0132140 A1 | 5/2013 | Amin et al. |
| 2013/0132246 A1 | 5/2013 | Amin et al. |
| 2013/0132274 A1 | 5/2013 | Henderson et al. |
| 2013/0132887 A1 | 5/2013 | Amin et al. |
| 2013/0189953 A1 | 7/2013 | Mathews |
| 2013/0200153 A1 | 8/2013 | Dorsey et al. |
| 2013/0207481 A1 | 8/2013 | Gobburu et al. |
| 2013/0225081 A1 | 8/2013 | Doss et al. |
| 2013/0246207 A1 | 9/2013 | Novak et al. |
| 2013/0246301 A1 | 9/2013 | Radhakrishnan et al. |
| 2013/0254117 A1 | 9/2013 | von Mueller et al. |
| 2013/0290522 A1 | 10/2013 | Behm, Jr. |
| 2013/0291018 A1 | 10/2013 | Billings et al. |
| 2014/0001257 A1 | 1/2014 | Dorsey et al. |
| 2014/0001263 A1 | 1/2014 | Babu et al. |
| 2014/0017955 A1 | 1/2014 | Lo et al. |
| 2014/0057667 A1 | 2/2014 | Blankenship et al. |
| 2014/0061301 A1 | 3/2014 | Cho et al. |
| 2014/0076964 A1 | 3/2014 | Morley |
| 2014/0096179 A1 | 4/2014 | Ben-Shalom et al. |
| 2014/0097242 A1 | 4/2014 | McKelvey |
| 2014/0099888 A1 | 4/2014 | Flanagan et al. |
| 2014/0124576 A1 | 5/2014 | Zhou et al. |
| 2014/0129135 A1 | 5/2014 | Holden et al. |
| 2014/0129302 A1 | 5/2014 | Amin et al. |
| 2014/0129951 A1 | 5/2014 | Amin et al. |
| 2014/0136318 A1 | 5/2014 | Alberth, Jr. et al. |
| 2014/0144983 A1 | 5/2014 | Dorsey et al. |
| 2014/0172700 A1 | 6/2014 | Teuwen et al. |
| 2014/0184505 A1 | 7/2014 | Fullerton et al. |
| 2014/0188639 A1 | 7/2014 | Dinardo, Sr. |
| 2014/0203082 A1 | 7/2014 | Huh |
| 2014/0214670 A1 | 7/2014 | Mckenna |
| 2014/0254820 A1 | 9/2014 | Gardenfors et al. |
| 2014/0278589 A1 | 9/2014 | Rados et al. |
| 2014/0279518 A1 | 9/2014 | Acuna-Rohter |
| 2014/0379580 A1 | 12/2014 | Varma et al. |
| 2015/0206416 A1 | 7/2015 | Marra et al. |

FOREIGN PATENT DOCUMENTS

| | | |
|---|---|---|
| JP | 2003-108777 A | 4/2003 |
| JP | 2004-078662 A | 3/2004 |
| JP | 2005-269172 A | 9/2005 |
| JP | 2006-139641 A | 6/2006 |
| JP | 2006-179060 A | 7/2006 |
| JP | 2006-308438 A | 11/2006 |
| KR | 10-0452161 B1 | 10/2004 |
| KR | 10-2005-0077659 A | 8/2005 |
| KR | 10-2008-0039330 A | 5/2008 |
| WO | 01/65827 A2 | 9/2001 |
| WO | 02/084548 A1 | 10/2002 |
| WO | 2010/097711 A2 | 9/2010 |
| WO | 2010/135174 A1 | 11/2010 |

OTHER PUBLICATIONS

Notice of Allowance dated Jul. 31, 2019, for U.S. Appl. No. 15/393,685, of Lewis, J., et al., filed Dec. 29, 2016.

Final Office Action dated Feb. 8, 2019, for U.S. Appl. No. 14/312,371, of Varma A.K., et al., filed Jun. 23, 2014.

Non-Final Office Action dated Dec. 13, 2007, for U.S. Appl. No. 10/355,557, of Niedermeyer, B.J., filed Jan. 31, 2003.

Notice of Allowance dated Feb. 26, 2008, for U.S. Appl. No. 10/355,557, of Niedermeyer, B.J., filed Jan. 31, 2003.

First Examination Report for Australian Patent Application No. 2012281153, dated Mar. 20, 2015.

Examiner Requisition for Canadian Application No. 2,841,267, dated Jul. 14, 2015.

(56) References Cited

OTHER PUBLICATIONS

Non-Final Office Action dated Sep. 11, 2015, for U.S. Appl. No. 14/271,368, of Lewis, J., et al., filed May 6, 2014.
Non-Final Office Action dated Oct. 5, 2015, for U.S. Appl. No. 13/829,658, of Morgan, T.B., et al., filed Mar. 14, 2013.
Second Examination Report for Australian Patent Application No. 2012281153, dated Nov. 13, 2015.
Non-Final Office Action dated Nov. 18, 2015, for U.S. Appl. No. 14/182,655, of Spindel, N., et al., filed Feb. 18, 2014.
Third Examination Report for Australian Patent Application No. 2012281153, dated Jan. 13, 2016.
Non-Final Office Action dated Jan. 20, 2016, for U.S. Appl. No. 14/271,368, of Lewis, J., et al., filed May 6, 2014.
Advisory Action dated Mar. 3, 2017, for U.S. Appl. No. 15/087,581, of Quigley, O.S.C., et al., filed Mar. 31, 2016.
Notice of Acceptance for Australian Patent Application No. 2012281153, dated Apr. 1, 2016.
Final Office Action dated Apr. 27, 2016, for U.S. Appl. No. 14/182,655, of Spindel, N., et al., filed Feb. 18, 2014.
Final Office Action dated Jun. 20, 2016, for U.S. Appl. No. 13/829,658, of Morgan, T.B., et al., filed Mar. 14, 2013.
Non-Final Office Action dated Jul. 5, 2016, for U.S. Appl. No. 14/271,350, of Lewis, J., et al., filed May 6, 2014.
Non-Final Office Action dated Jul. 8, 2016, in U.S. Appl. No. 15/087,581, of Quigley, O.S.C., et al., filed Mar. 31, 2016.
Final Office Action dated Jul. 29, 2016, for U.S. Appl. No. 14/271,368, of Lewis, J., et al., filed May 6, 2014.
Non-Final Office Action dated Sep. 8, 2016, for U.S. Appl. No. 14/312,371, of Varma, A.K., et al., filed Jun. 23, 2014.
Advisory Action dated Sep. 21, 2016, for U.S. Appl. No. 13/829,658, of Morgan, T.B., et al., filed Mar. 14, 2013.
Non-Final Office Action dated Sep. 22, 2016, for U.S. Appl. No. 14/182,655, of Spindel, N., et al., filed Feb. 18, 2014.
Notice of Allowance for Canadian Patent Application No. 2,841,267, dated Oct. 13, 2016.
Notice of Allowance dated Oct. 13, 2016, for U.S. Appl. No. 14/271,368, of Lewis, J., et al., filed May 6, 2014.
Final Office Action dated Dec. 23, 2016, for U.S. Appl. No. 15/087,581, of Quigley, O.S.C., et al., filed Mar. 31, 2016.
Final Office Action dated Jan. 18, 2017, for U.S. Appl. No. 14/271,350, of Lewis, J., et al., filed May 6, 2014.
Non-Final Office Action dated Mar. 15, 2017, for U.S. Appl. No. 13/829,658, of Morgan, T.B., et al., filed Mar. 14, 2013.
Office Action for European Patent Application No. 12736048.5, dated Apr. 3, 2017.
Final Office Action dated Apr. 27, 2017, for U.S. Appl. No. 14/312,371, of Varma, A.K., et al., filed Jun. 23, 2014.
Notice of Allowance dated Jun. 26, 2017, for U.S. Appl. No. 15/087,581, of Quigley, O.S.C., et al., filed Mar. 31, 2016.
Advisory Action dated Jul. 11, 2017, for U.S. Appl. No. 14/312,371, of Varma, A.K., et al., filed Jun. 23, 2014.
Final Office Action dated Sep. 15, 2017, for U.S. Appl. No. 14/182,655, of Spindel, N., et al., filed Feb. 18, 2014.
Notice of Allowance dated Oct. 26, 2017, for U.S. Appl. No. 14/271,350, of Lewis, J., et al., filed May 6, 2014.
Notice of Allowance dated Nov. 24, 2017, for U.S. Appl. No. 13/829,658, of Morgan, T.B., et al., filed Mar. 14, 2013.
Non-Final Office Action dated Mar. 21, 2018, for U.S. Appl. No. 14/182,655, of Spindel, N., et al., filed Feb. 18, 2014.
Non-Final Office Action dated Jul. 12, 2018, for U.S. Appl. No. 14/312,371, of Varma, A.K., et al., filed Jun. 23, 2014.
Summons to Oral Proceedings for European Patent Application No. 12736048.5, dated Jul. 25, 2018.
Notice of Allowance dated Sep. 21, 2018, for U.S. Appl. No. 14/182,655, of Spindel, N., et al., filed Feb. 18, 2014.
Non-Final Office Action dated Sep. 21, 2018, for U.S. Appl. No. 15/393,685, of Lewis, J., et al., filed Dec. 29, 2016.
Non-Final Office Action dated Oct. 3, 2019, for U.S. Appl. No. 16/251,188, of Spindel N., et al., filed Jan. 18, 2019.

"2.5mm Headset Jack," Retrieved from the Internet URL: http://www.phonescoop.com/glossary/term.php?gid=360, on May 5, 2011, pp. 1-1.
"A Magnetic Stripe Reader—Read Credit Cards & Driver Licences!," Articlesbase (articlesbase.com), Sep. 7, 2009, Retrieved from the Internet URL: http://www.articlesbase.com/electronics-articles/a-magnetic-stripe-reader-read-credit-cards-. . . , on Feb. 8, 2011, pp. 1-3.
Acidus, "Mag-stripe Interfacing—A Lost Art," Retrieved from the Internet URL: http://www.scribd.com/doc/18236182/Magstripe-Interfacing#open_ . . . , on Feb. 7, 2011, pp. 1-4.
"Advancing Payment Security: MasterCard Contactless Security Overview," www.mastercard.com, retrieved from Internet URL: https://www.mastercard.com/contactless/doc/MasterCardContactless_SecurityFactSheet_2015.pdf, on Jun. 12, 2017, pp. 1-4.
"Announcement: Semtek Introduces Side Swipe II Card Reader for Wireless Devices," Brighthand, Retrieved from the Internet URL: http://forum.brighthand.com/pdas-handhelds/173285-announcement-semtek-introduces-sid . . . , on Apr. 19, 2011, pp. 1-2.
"Arduino magnetic stripe decoder," Instructables, Retrieved from the Internet URL: http://www.instructables.com/id/Arduino-magneticstripe-decoder/, on Feb. 8, 2011, pp. 1-5.
"Barcode scanner and Magnetic Stripe Reader (MSR) for Pocke . . . ," Tom's Hardware (tomshardware.com), Retrieved from the Internet URL: http://www.tomshardware.com/forum/24068-36-barcode-scanner-magnetic-stripe-reader-po . . . , on Feb. 8, 2011, pp. 1-2.
Bauer, G.R. et al., "Comparing Block Cipher Modes of Operation on MICAz Sensor Nodes," 17th Euromicro International Conference on Parallel, Distributed and Network-based Processing, 2009, Feb. 18-20, 2009, pp. 371-378.
Bourdeauducq, S., "Reading magnetic cards (almost) for free" ("Lekernel"), Jan. 26, 2009, Retrieved from the Internet URL: http://lekernel.net/blog/?p=12, on May 5, 2011, pp. 1-2.
Buttell, A.E., "Merchants eye mobile phones to transact card payments," Feb. 3, 2010, Retrieved from the Internet URL: http://www.merchantaccountguide.com/merchant-account-news/cell-phone-credit-card-mer . . . , on Feb. 8, 2011, pp. 1-3.
"Card Not Present Transaction," Wikipedia, published Mar. 4, 2014, Retrieved from the Internet URL: http://en.wikipedia.org/wiki/Card_not_present_transaction, on Jun. 6, 2014, pp. 1-2.
"Credit Card Swiper and Reader for iPhone, iPad, Blackberry, Android and more," Retrieved from the Internet URL: http://hubpages.com/hub/Credit-Card-Swiper-and-Reader-for-iPhone-iPad-Blackberry-An . . . , on Apr. 20, 2011, pp. 1-2.
"Get paid on the spot from your mobile phone," Retrieved from the Internet URL: http://payments.intuit.com/products/basic-payment-solutions/mobile-credit-card-processin . . . , on Feb. 11, 2011, pp. 1-3.
Goode, L., "Paying With Square's New Mobile-Payments App," All Things D, dated Apr. 30, 2012, Retrieved from the Internet URL: http://allthingsd.com/20120430/paying-with-squares-new-mobile-payments-app/, on Nov. 7, 2014, pp. 1-3.
Grandison, K., "vTerminal Credit Card Processing App for AuthorizeNet and PayPal Payflow Pro for Curve 8350 8500 8900 and Bold 9000," Retrieved from the Internet URL: http://www.4blackberry.net/tag/business-tools/vterminal-credit-card-processing-app-for-authorizenet-and-paypal-payflow-pro-for-curve-8350-8500-890-download-2075.html, on Mar. 30, 2015, pp. 1-4.
Harris, A., "Magnetic Stripe Card Spoofer," Aug. 4, 2008, Retrieved from the Internet URL: http://hackaday.com/2008/08/04/magnetic-stripe-card-spoofer/, on Apr. 25, 2011, pp. 1-11.
"Headphone Jack (3.5mm)," Retrieved from the Internet URL: http://www.phonescoop.com/glossary/term.php?gid=440, on May 5, 2011, pp. 1-1.
Jones, R., "U.S. Credit Cards to get a high-tech makeover," Oct. 22, 2010, Retrieved from the Internet URL: http://lifeine.today.com/news/2010/10/22/5334208-us-credit-cards-to-get-a-high-tech-mak . . . , on Feb. 8, 2011, pp. 1-8.
Kuo, Y-S et al., "Hijacking Power and Bandwidth from the Mobile Phone's Audio Interface," Proceedings of the First ACM Symposium on Computing for Development, (DEV'10), Dec. 17, 2010, pp. 1-10.

(56) References Cited

OTHER PUBLICATIONS

Lucks, S., "Two-Pass Authenticated Encryption Faster than Generic Composition," H. Gilbert and H. Handschuh (Eds.): FSE 2005, LNCS 3557, © International Association for Cryptologic Research 2005, pp. 284-298.
"Magnetic Card Reader," lekernel.net~scrapbook, Retrieved from the Internet URL: http://lekernel.net/scrapbook/old/cardreader.html, on Apr. 25, 2011, pp. 1-4.
"Magnetic Stripe Reader (MSR) MSR7000-100R," Motorola Solutions, Retrieved from the Internet URL: http://www.motorola.com/business/US-EN/MSR7000-100R_US-EN.do?vgnextoid=164fc3 . . . , on Feb. 8, 2011, pp. 1-1.
"Magnetic stripe reader/writer," Retrieved from the Internet URL: http://www.gae.ucm.es/-padilla/extrawork/stripe.html, on Dec. 21, 2009, pp. 1-2.
"Mag-stripe readers the hunt for a homebrew mag-stripe reader that'll work with modem," Jan. 16, 2009, Retrieved from the Internet URL: http://www.hak5.org/forums/index.php?showtopic=11563&st=20, on Apr. 25, 2011, pp. 1-6.
"Mophie Marketplace Magnetic Strip Reader/Case for iPhone 3G & 3GS—Grey," J&R (JR.com), Retrieved from the Internet URL: http://www.jr.com/mophie/pe/MPE_MPIP3GBLK/, on Feb. 8, 2011, pp. 1-1.
"MSR500EX (Mini123EX) Portable Magnetic Stripe Card Reader," TYNER, Apr. 27, 2007, Retrieved from the Internet URL: http://www.tyner.com/magnetic/msr500ex.htm, on Apr. 22, 2011, pp. 1-3.
"Munson, J., and Gupta, V.K., ""Location-Based Notification as a General-Purpose Service,"" dated Sep. 28, 2002, Retrieved from the Internet URL—https://ai2-s2-pdfs.s3.amazonaws.com/1bb5/6ae0a70b030e2f2376ed246834bddcabd27b.pdf, pp. 40-44".
Myres, L., "The Mac Security Blog: What is Multi-Factor Authentication, and How Will It Change in the Future?," Intego, dated Aug. 17, 2012, Retrieved from the Internet URL: http://www.intego.com/mac-security-blog/what-is-multi-factor-authentication-and-how-will-it-change-in-the-future/, on Nov. 11, 2014, pp. 1-4.
"Online Shopping," dated Nov. 2, 2014, Retrieved from the Internet URL: http://en.wikipedia.org/wiki/Online_shopping, on Nov. 10, 2014, pp. 1-12.
Padilla, L. "The simplest magnetic stripe reader," Jan. 27, 2003, Retrieved from the Internet URL: www.gae.ucm.esi~padilla/extrawork/soundtrack.html, on Dec. 21, 2009, pp. 1-5.
Padilla, L., "Magnetic stripe reader circuit," Jan. 28, 1997, Retrieved from the Internet URL: http://www.gae.ucm.es/~padilla/extraworklmagamp.html, on May 5, 2011, pp. 1-7.
Padilla, L., "Turning your mobile into a magnetic stripe reader," Retrieved from the Internet URL: http://www.gae.ucm.es/~padilla/extrawork/mobilesoundtrack.html, on Feb. 7, 2011, pp. 1-4.
"Payment Gateway," Wikipedia, published May 30, 2014, Retrieved from the Internet URL: http://en.wikipedia.org/wiki/Payment gateways, on Jun. 6, 2014, pp. 1-3.
"Pay@PC," Retrieved from the Internet URL: http://www.merchantanywhere.com/PAY_AT_PCT@PC.htm, on Feb. 11, 2011, pp. 1-2.
"Reference Designations for Electrical and Electronics Parts and Equipment, Engineering Drawing and Related Documentation Practices," ASME Y14.44-2008, The American Society of Mechanical Engineers, Nov. 21, 2008, pp. 1-31.
"Semtek 3913 Insert Magnetic Card Reader 20 Pin Serial RS232," Product description, RecycledGoods.com, Retrieved from the Internet URL: http://www.recycledgoods.com/products/Semtek-3913-Insert-Magnetic-Card-Reader-20-Pi . . . , on Apr. 19, 2011, pp. 1-3.
"Semtek to target healthcare with HandEra PDAs and PDA swipe card reader," Aug. 29, 2001, Retrieved from the Internet URL: http://www.pdacortex.com/semtek.htm, on Apr. 19, 2011, pp. 1-2.
Titlow, J.P., "ROAM pay is like Square for Blackberry (Plus Android, iOS and Desktops)," Dec. 1, 2010, Retrieved from the Internet URL: http://www.readwriteweb.com/biz/2010/12/roampay-is-like-square-for-bla.php, on Apr. 20, 2011, pp. 1-12.
"Touch-Pay Wireless Credit Card Processing," MerchantSeek, Retrieved from the Internet URL: http://www.merchantseek.com/wireless-credit-card-processing.htm, on Feb. 11, 2011, pp. 1-5.
"Travel industry targeted for Palm PDA card reader," Retrieved from the Internet URL: http://www.m-travel.com/news/2001/08/travel_industry.html, on Apr. 19, 2011, pp. 1-2.
"Uber—Android Apps on Google Play," Published on Nov. 10, 2014, Retrieved from the Internet URL: https://play.google.com/store/apps/details?id=com.ubercab&hl=en, on Nov. 12, 2014, pp. 1-2.
"USB Magnetic Stripe Credit/Card Track-2 Reader and Writer (75/210BPI)," Deal Extreme (dealextreme.com), Nov. 15, 2008, Retrieved from the Internet URL: http://www.dealextreme.com/p/usb-magnetic-stripe-credit-debit-card-track-2-reader-and-wr . . . , on Feb. 8, 2011, pp. 1-3.
Veneziani, V., "Use a cellphone as a magnetic card reader," Apr. 15, 2005, Retrieved from the Internet URL: http://hackaday.com/2005/04/15/use a-cellphone-as-a-magnetic-card . . . , on Feb. 7, 2011, pp. 1-10.
"Verified by Visa Acquirer and Merchant Implementation Guide," U.S. Region, Visa Public, May 2011, pp. 1-114.
Wallen, J., "Five Top Apps for Managing Inventory," Tech Republic, dated Aug. 15, 2012, Retrieved from the Internet URL: http://www.techrepublic.com/blog/five-apps/five-top-apps-for-managing-inventory/, on Nov. 10, 2014, pp. 1-7.
Website: www.alexwinston.com, Aug. 31, 2009, pp. 1-5.
Non-Final Office Action dated Sep. 13, 2006, for U.S. Appl. No. 10/355,557, of Niedermeyer, B.J., filed Jan. 31, 2003.
Final Office Action dated Feb. 9, 2007, for U.S. Appl. No. 10/355,557, of Niedermeyer, B.J., filed Jan. 31, 2003.
Non-Final Office Action dated Apr. 30, 2007, for U.S. Appl. No. 10/355,557, of Niedermeyer, B.J., filed Jan. 31, 2003.
Final Office Action dated Sep. 26, 2007, for U.S. Appl. No. 10/355,557, of Niedermeyer, B.J., filed Jan. 31, 2003.
Notice of Allowance dated Feb. 14, 2020, for U.S. Appl. No. 16/251,188 of Spindel N., et al., filed Jan. 18, 2019.

* cited by examiner

| Coffee Shop | | | |
| (415) 123-4567 ⤷ 302 | | | |
| Item Description ⤷ 304 | Price | Quantity | Total |
| Mocha | $4.00 | 1 | $4.00 ⊗ |
| Cookie | $1.00 | 1 | $1.00 ⊗ |
| | | Shipping | In-store pickup |
| | | Tax | Included |
| | | Total | $5.00 ⤷ 306 |

Checkout
308

VERIFYING PROXIMITY DURING PAYMENT TRANSACTIONS

CROSS-REFERENCE TO RELATED APPLICATION

This application is a continuation of, and claims priority to, U.S. patent application Ser. No. 13/829,658, filed Mar. 14, 2013, issued as U.S. Pat. No. 9,940,616, which is incorporated by referenced herein in its entirety.

TECHNICAL FIELD

This disclosure relates to payment processing using a mobile device.

BACKGROUND

In a conventional electronic credit card transaction at an online store, the transaction is authorized and captured over a network connection. In the authorization stage, credit card information is entered into an interface of the online store, e.g., a payment form. A payment request is sent electronically from a computing device running the online store to a credit card processor. The credit card processor routes the payment request to a card network, e.g., Visa or Mastercard, which in turn routes the payment request to the card issuer, e.g., a bank. Assuming the card issuer approves the transaction, the approval is then routed back to the online store. In the capture stage, the approved transaction is again routed from the online store to the credit card processor, card network and card issuer. The capture stage can trigger the financial transaction between the card issuer and the merchant, and optionally creates a receipt. There can also be other entities, e.g., the card acquirer, in the route of the transaction. Debit card transactions have a different routing, but also require entry of card information.

SUMMARY

A customer can purchase items for sale at an online store of the merchant. Generally, the customer enters in financial payment information, e.g., credit card information, when completing the online transaction. If a hacker steals the financial payment information, the hacker can fraudulently conduct online transactions.

Merchants can increase security of the online transaction by requiring a two factor authentication before completing an online transaction. The customer can select items for purchase on a first device, e.g., a desktop computer. The online store can request a unique identifier, e.g., a mobile phone number, associated with a second device owned by the customer. The customer can enter the unique identifier to receive a notification of the purchase at the second device, e.g., the mobile device of the customer. The customer can confirm the purchase using the second device.

The second device can determine whether it is in proximity to the first device. In some implementations, a payment service system considers the determination of proximity as a factor in approving or rejecting the transaction. In some other implementations, if the second device is not in proximity to the first device, the customer is unable to complete the transaction at the second device.

In one aspect, a method of processing a transaction for a customer using a first device and a second device, comprising: receiving a notification from the first device, where the notification includes a selection of one or more items for purchase, where the notification includes an identifier, and where the identifier uniquely identifies both the customer and a second device; determining that the second device is in proximity to the first device as an authentication measure; in response to the determining, sending the determination to the second device, where the second device displays details regarding the selection of the one or more items for purchase; receiving, from the second device, user input indicating a confirmation of the purchase of the one or more items; submitting, to a payment processor, the details for authentication.

Implementations can include one or more of the following. Determining that the second device is in proximity to the first device comprises: determining a first location of the first device; determining a second location of the second device; and determining the distance between the first location and the second location is within a predetermined distance. Sending, to both the first and second devices, confirmation of the authentication from the payment processor. The details include, for each item, a respective description and a respective price. The unique identifier is one of the following: a phone number, a pay phrase, or a password. Receiving the user input comprises receiving a swipe, at the second device, that confirms the purchase of the one or more items.

In another aspect, a method of processing a transaction for a customer using a first device and a second device, comprising: receiving, at the first device, first user input to purchase one or more items for sale; receiving an identifier for the customer, where the identifier uniquely identifies both the customer and the second device; sending, from the first device to the second device, a notification of the one or more items selected for purchase; determining that the second device is in proximity to the first device as an authentication measure; in response to the determining, displaying, at the second device, details regarding the one or more items selected for purchase; receiving, at the second device, second user input to confirm the purchase of the one or more items; and submitting, to a payment processor, the details for authentication.

Implementations can include one or more of the following features. Sending the notification to the second device comprises: sending the notification from the first device to a server; and forwarding the notification from the server to the second device. Sending the notification to the second device comprises broadcasting the notification to the second device using a short range communication protocol. The short range communication protocol is one of the following: Near Field Communication, Bluetooth, or sound. Determining that the second device is in proximity to the first device comprises: determining a first location of the first device; determining a second location of the second device; and determining the distance between the first location and the second location is within a predetermined distance. Receiving, at both the first and second devices, confirmation of the authentication from the payment processor and displaying the confirmation. The details include, for each item, a respective description and a respective price. Receiving the unique identifier comprises: displaying an input field; receiving, through the input field, the unique identifier based on input of the customer. The customer is logged into the first device, and where receiving the unique identifier comprises accessing the unique identifier from an account of the customer. The unique identifier is one of the following: a phone number, a pay phrase, or a password. Receiving the second user input comprises receiving a swipe that confirms the purchase of the one or more items.

In another aspect, a system for processing a transaction for a customer, comprising: a first device, where the first device receives first user input to purchase one or more items for sale, and where the first device receives an identifier for the customer; a second device, where the identifier uniquely identifies both the customer and the second device; and a payment processor, where one of the first device, the second device, or the payment processor determines that the second device is in proximity to the first device as an authentication measure, where in response to the determining, the second device is configured to perform operations comprising: displaying details regarding the one or more items selected for purchase; receiving second user input to confirm the purchase of the one or more items; and submitting the details for authentication to the payment processor.

In another aspect, a method of processing a transaction for a customer using a first device and a second device, comprising: receiving a notification from the first device, where the notification includes a selection of one or more items for purchase, where the notification includes an identifier, and where the identifier uniquely identifies both the customer and a second device; sending the notification to the second device, where the second device displays details regarding the selection of the one or more items for purchase; receiving, from the second device, user input indicating a confirmation of the purchase of the one or more items; determining whether the first device is in proximity to the second device as an authentication measure; submitting, to a payment processor, the details and the determination of proximity for authentication, where the payment processor determines whether to approve the transaction based at least on the determination of proximity.

Implementations can include one or more of the following features. Determining that the second device is in proximity to the first device comprises: determining a first location of the first device; determining a second location of the second device; and determining the distance between the first location and the second location is within a predetermined distance. Sending, to both the first and second devices, confirmation of the authentication from the payment processor. The details include, for each item, a respective description and a respective price. The unique identifier is one of the following: a phone number, a pay phrase, or a password. Receiving the user input comprises receiving a swipe, at the second device, that confirms the purchase of the one or more items.

In another aspect, a method of processing a transaction for a customer using a first device and a second device, comprising: receiving, at the first device, first user input to purchase one or more items for sale; receiving a unique identifier for the customer, where the unique identifier identifies both the customer and the second device; sending, from the first device to the second device, a notification of the one or more items selected for purchase; displaying, at the second device, details regarding the one or more items selected for purchase; receiving, at the second device, second user input to confirm the purchase of the one or more items; determining whether the first device is in proximity to the second device as an authentication measure; submitting, to a payment processor, the details and the determination of proximity for authentication, where the payment processor determines whether to approve the transaction based at least on the determination of proximity.

Implementations can include one or more of the following features. Sending the notification to the second device comprises: sending the notification from the first device to a server; and forwarding the notification from the server to the second device. Sending the notification to the second device comprises broadcasting the notification to the second device using a short range communication protocol. The short range communication protocol is one of the following: Near Field Communication, Bluetooth, or sound. Determining that the second device is in proximity to the first device comprises: determining a first location of the first device; determining a second location of the second device; and determining the distance between the first location and the second location is within a predetermined distance. Receiving, at both the first and second devices, confirmation of the authentication from the payment processor and displaying the confirmation. The details include, for each item, a respective description and a respective price. Receiving the unique identifier comprises: displaying an input field; receiving, through the input field, the unique identifier through input of the customer. The customer is logged into the first device, and where receiving the unique identifier comprises accessing the unique identifier from an account of the customer. The unique identifier is one of the following: a phone number, a pay phrase, or a password. Receiving the second user input comprises receiving a swipe that confirms the purchase of the one or more items.

Advantages may include one or more of the following. Online transactions can be conducted with two factor authentication, thereby increasing security for both the merchant and the customer. In particular, a payment service system can ensure the transaction is conducted using two devices that are in proximity with each other, where one of the devices is owned by the customer.

BRIEF DESCRIPTION OF THE DRAWINGS

FIGS. 3A-B are illustrations of an example user interface of the first device when conducting the transaction.

Like reference numbers and designations in the various drawings indicate like elements.

DETAILED DESCRIPTION

Figure 1:
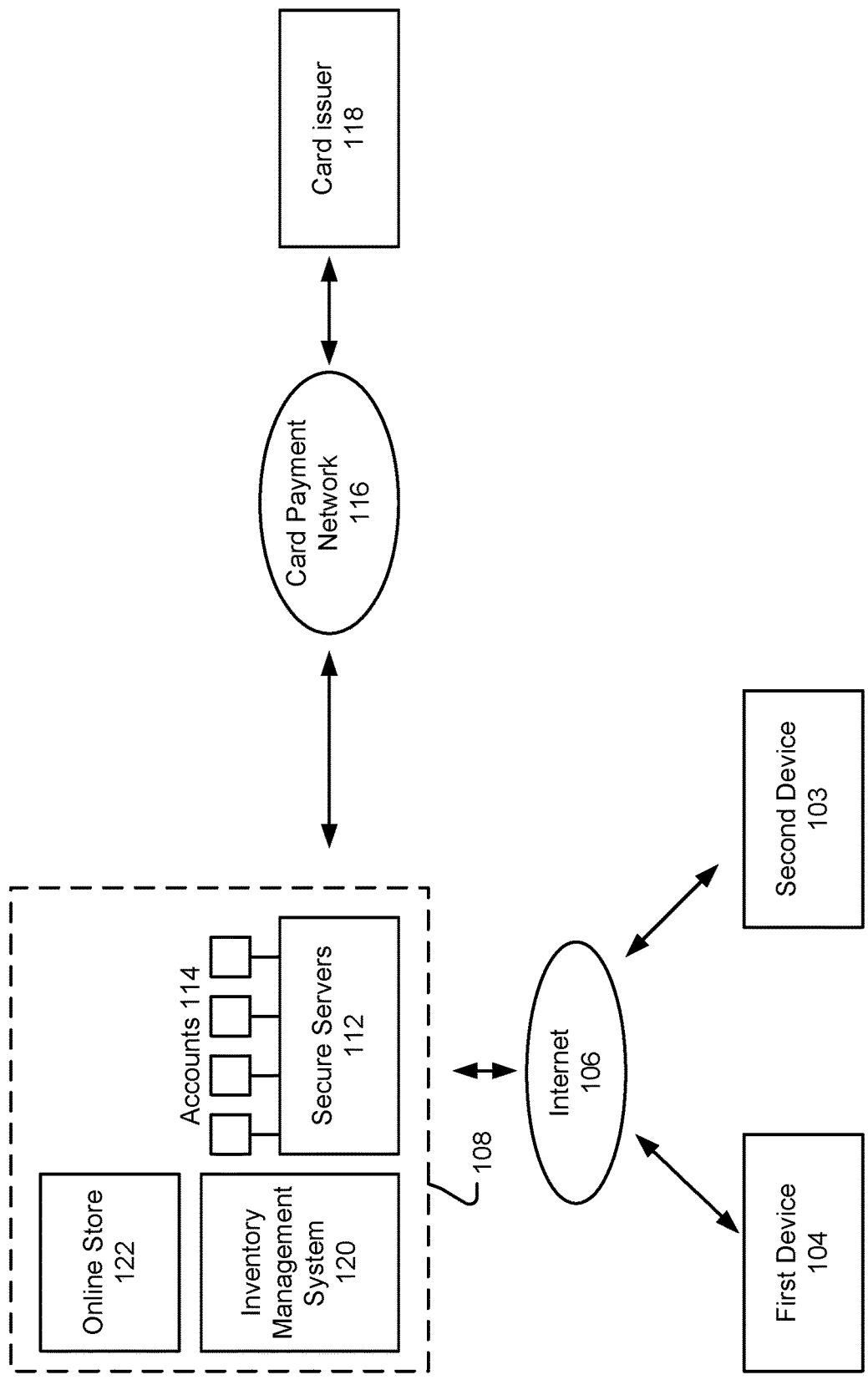
FIG. 1 is a schematic illustration of an example payment system architecture.

FIG. 1 is a schematic illustration of an example payment system architecture 100. The overall system 100 includes a first device 104, e.g., a desktop computer, connected to a network, e.g., the Internet 106. The first device 104 is a computing device capable of running an Internet browser. For example, the first device 104 can be a smartphone, tablet, a desktop computer, a laptop computer, or other data processing apparatus. The second device 103 is also a computing device connected to the Internet 106. The second device 103 can be a mobile device, e.g., a smartphone, tablet, or other portable data processing apparatus. When conducting a transaction, a customer can select items for sale from a merchant's online store using the first device 104 and confirm purchase of the selected items for sale using the second device 103. This will be described further below in reference to FIGS. 2-5.

A payment processor operates a payment service system 108. The payment processor processes transactions conducted using the first and second devices 103, 104. The first device 104 can receive selection of items for purchase and card information, e.g., through user input at an online form, for the transaction at an online store 122. The online store 122 will be described further below. The second device 103 can send confirmation of the purchases to the payment service system 108. The first and second devices 103, 104 communicate with the payment service system 108 using the network 106. The payment service system 108 includes one or more servers 112, at least some of which can handle secure transactions (e.g., using a secure server), to process all transactions with the mobile device 104. In general, servers 112 can store public merchant information such as the merchant's address or phone number. The servers 112 also handle secure information such as credit card numbers, debit card numbers, bank accounts, user accounts, user identifying information or other sensitive information.

The payment service system 108 can communicate with a computer system 116 of a card payment network, e.g., Visa or MasterCard. The payment service system 108 can communicate with a computer system 116 over the same network 106 used to communicate with the mobile device 104, or over a different network. The computer system 116 of the card payment network can communicate in turn with a computer system 118 of a card issuer, e.g., a bank. There can also be computer systems of other entities, e.g., the card acquirer, between the payment service system 108 and the card issuer.

Eventually, in order to receive funds from the transaction, the merchant will need to enter financial account information into the payment service system 108 sufficient to receive funds. For example, in the case of a bank account, the merchant can enter the bank account number and routing number. The merchant's financial account can also be associated with a credit card account or another third party financial account. In addition, in some implementations, if the merchant has not entered the financial account information, the payment processor can hold the received funds until the financial account information is provided.

The payment service system 108 can also include an inventory management system 120. The inventory management system 120 manages items for sale by the merchant, e.g., using one or more databases. For example, the inventory management system 120 can store details for each item. The details can include a title, a price, quantity, or a description of the item. Therefore, the payment service system 108 can not only process financial transactions but can also manage inventory for the merchant.

The payment service system 108 can also include the online store 122. In some implementations, a merchant operates the online store 122 using the merchant's own external systems. Inventory data for the online store 122 can be pulled from the inventory management system 120. For example, the online store 122 can host one or more resources that are accessible by browser running on a device connected to the network 106. The one or more resources can include details of the inventory owned by the merchant, e.g., pulled from a database of the inventory management system 120.

Figure 2:
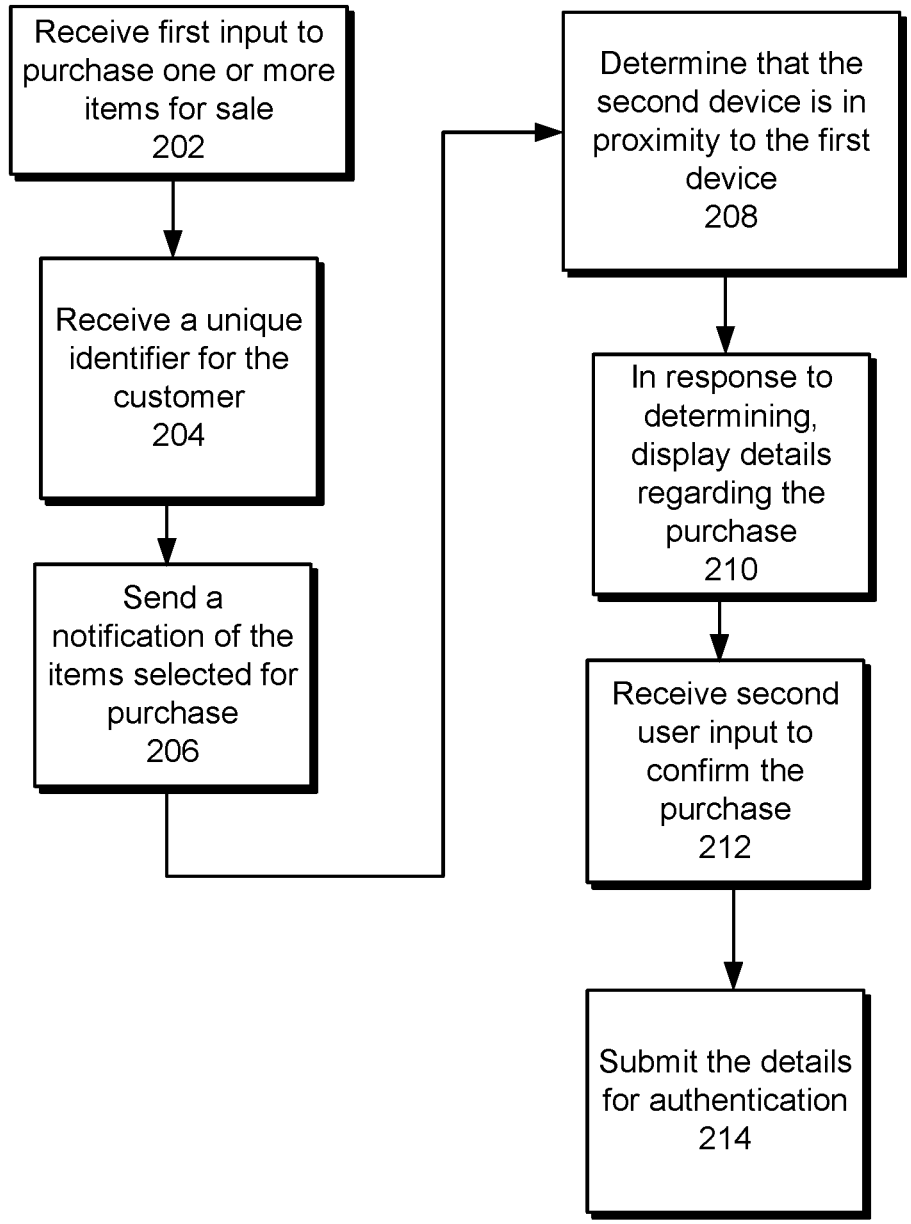
FIG. 2 is a flow chart of an example process of verifying proximity when conducting a transaction using a first device and a second device.

FIG. 2 is a flow chart of an example process of verifying proximity when conducting a transaction using a first device and a second device. For convenience, the process will be described with respect to the first device and the second device as described above in reference to FIG. 1.

The first device receives first user input to purchase one or more items for sale in an electronic transaction (step 202). The one or more items can be listed in inventory of the merchant, as described above in reference to FIG. 1. The first user input can be received at a user interface, e.g., an online storefront of the merchant or a mobile device at a physical location of the merchant, that is displayed at the first device. The first user input can include a mouse click, keyboard input, a tap, or a swipe. An example of the user interface is described further below in reference to FIGS. 3A-B.

The first device receives a unique identifier from the customer, e.g., through additional input from the customer (step 204). For example, the first device can display an input field on the user interface and instruct the customer to enter the unique identifier. The first device can receive the unique identifier through the input field based on customer input. The unique identifier can be a phone number, a unique pay phrase, e.g., "John Smith Pay Phrase", a time-based token, or a password. In some implementations, the customer can be logged into the online storefront on the first device, e.g., through an Internet cookie. For example, the customer can have previously registered a user account at the online storefront. In some implementations, the unique identifier can be stored in the Internet cookie. The unique identifier can also be stored, e.g., in a database of a payment service system, as a customized setting on a profile of the user account.

The first device can send, to the second device, a notification of the items selected for purchase (step 206). A customer can engage with the notification to start a customer application running on the second device. The notification can include details of the items selected for purchase on the first device. The details can include, for each item, a respective description and a respective price. The customer application can display the details, as will be described further below. In some implementations, the first device sends the notification to a server, e.g., through the Internet to payment service system 108 or a merchant server, and the server forwards the notification to the second device. In some other implementations, the first device broadcasts the notification using a short range communication protocol. For example, the first device can act as a Bluetooth central and the second device can act as a Bluetooth peripheral. The central can detect when the peripheral is in close proximity and can identify it as running the customer application. At that point, the central can have a server, e.g., a payment service system, authenticate the peripheral as belonging to the individual. Other implementations of determining that two devices are in proximity to each other are possible, e.g., sound from a speaker of the first device into a microphone of the second device, or Near Field Communication (NFC).

A determination can be made as to whether the first device is in proximity to the second device (step 208). The first device, the second device, or a server, e.g., a payment service system, can make the determination. The determination can serve as an authentication measure for approving the transaction. In particular, the payment service system can consider the proximity determination when determining whether to authenticate, i.e., approve, the transaction. In some implementations, a location of the first device is obtained, e.g., using a Global Positioning Satellite (GPS) or an Internet Protocol address to location database, by the first device or the server. The location can be included in the notification to the second device. Upon receiving the notification, the second device can obtain its own location, e.g., using GPS or other location methods, and compare its own location with the location included in the notification. If the two locations are within a predetermined distance, e.g., thirty feet, the first device can be determined to be in proximity to the second device. In some other implementations, the server obtains the first device's location and the second device's location, determines whether the devices are in proximity to each other, and sends the determination to the first and second devices.

In some implementations, in response to determining the first device is in proximity to the second device, the second device displays details regarding the purchase of the items selected on the first device (step 210). An example of the details displayed is described below in reference to FIGS. 4A-B. In some implementations, if the first device is not in proximity to the second device, the first or second device receives a notification that indicates the transaction cannot be completed because of the lack of proximity. That is, the second device is unable to complete the transaction if the second device is not in proximity to the first device. If the second device is in proximity to the first device, the second device can display, e.g., using a customer application, an option to confirm the purchase.

After displaying the option to confirm the purchase, the second device can receive second user input to confirm the purchase of the items selected on the first device (step 212). For example, the second device can receive a swipe of a credit card through a user interface of the second device. Upon receiving the second user input, the second device can submit, e.g., to a payment service system, transaction details for authentication. The transaction details can include details regarding the items selected for purchase. The payment service system can approve the transaction based on the confirmation from the second device and can send the approval to both the first and second devices. Upon receiving the approval, the first and second devices can display the approval on a user interface of the online storefront and the customer application, respectively.

Figure 3B:
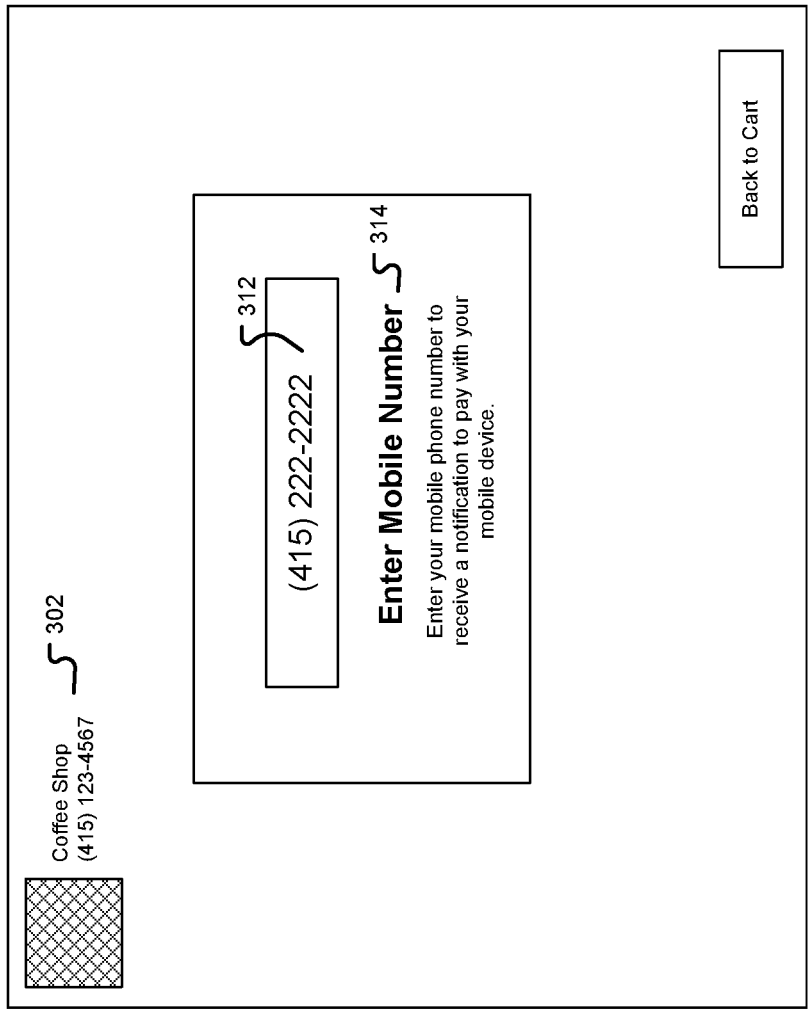

FIGS. 3A-B are illustrations of an example user interface of the first device when conducting the transaction. FIG. 3A is an example interface 300 of a shopping cart on a merchant's online storefront. A customer can use the first device to add items to the shopping cart. The shopping cart can include contact information 302 of the merchant. A customer has selected items 304 for purchase, e.g., a mocha and a cookie. The customer can choose to pick up the items in store or to be delivered to a customer's address. The item descriptions 304 include titles, prices, and quantities of the selected items. The shopping cart can display a total price 306 to the customer. The customer can interface with the checkout button 308 to continue purchasing the items.

FIG. 3B is an example interface 310 of the storefront after the customer interfaces with the checkout button 308. The first device can display a user interface, e.g., a text input field, to receive a unique identifier of the customer, as described above in reference to FIG. 2. For example, the online storefront displays a request for a mobile phone number of the customer 314. The customer can enter his or her mobile number 312, and the first device can send a notification to the second device, e.g., a mobile device associated with the mobile number.

Figure 4A:
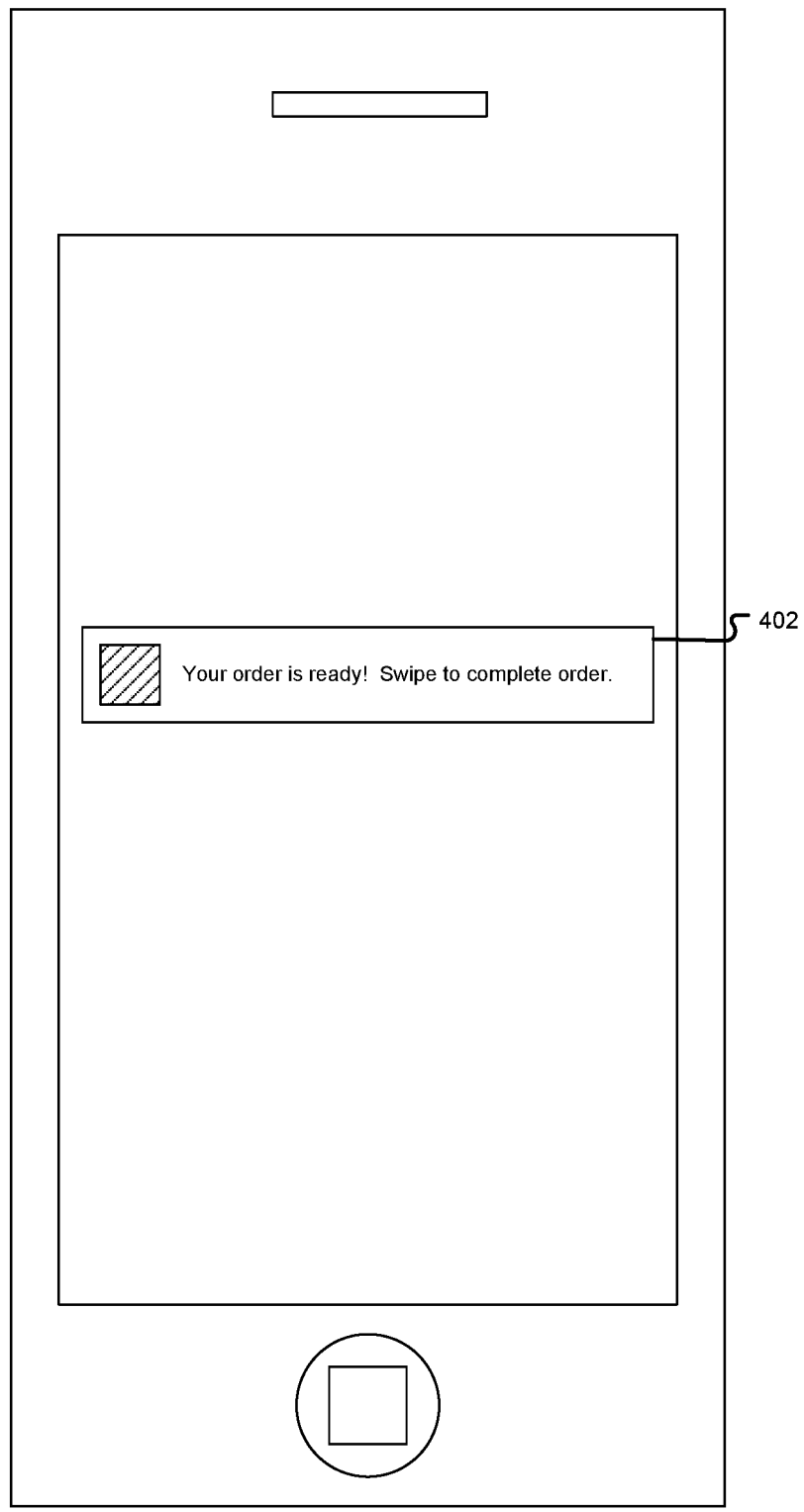
FIGS. 4A-B are illustrations of an example user interface of the second device when conducting the transaction.
Figure 4B:
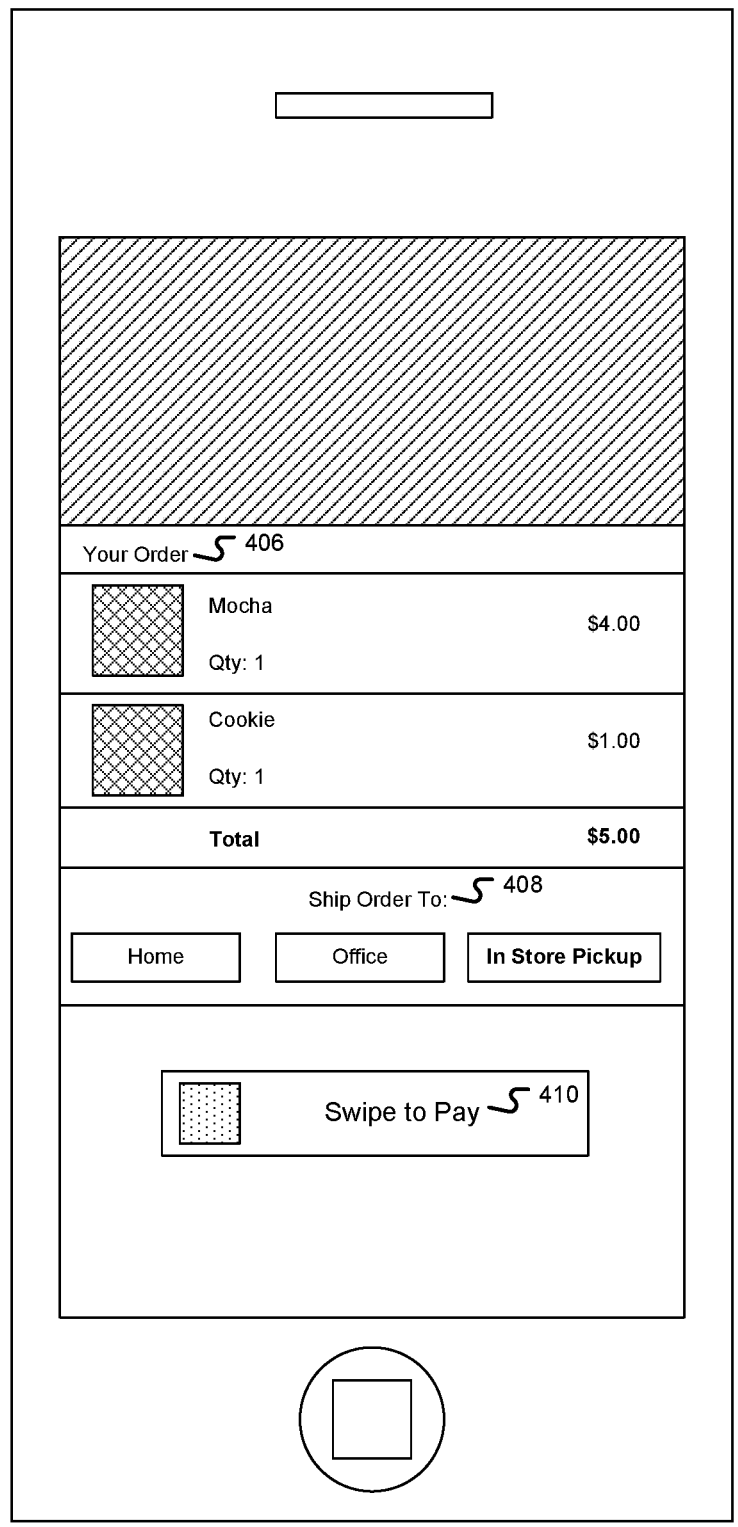

FIGS. 4A-B are illustrations of an example user interface of the second device when conducting the transaction. FIG. 4A is an example interface 400 of the second device receiving the notification 402. The customer can interface with the notification, e.g., the customer can swipe the user interface to open an application that can finish conducting the transaction.

FIG. 4B is an example interface 404 of the application running on the second device. The application can display details of the items selected for purchase on the first device 406, e.g., the mocha, the cookie, and their respective quantities and prices. In some implementations, the customer can select an address 408 to ship the order to. However, because the customer previously selected the items for in-store pickup on the first device, the second device displays the already selected shipping option on the interface. After reviewing the items selected for purchase, the customer can swipe the "Swipe to Pay" button 410 to confirm purchase of the items. Upon receiving the swipe through the user interface, the second device can submit the transaction for authentication by a payment service system as described above in reference to FIGS. 1-2.

Figure 5:
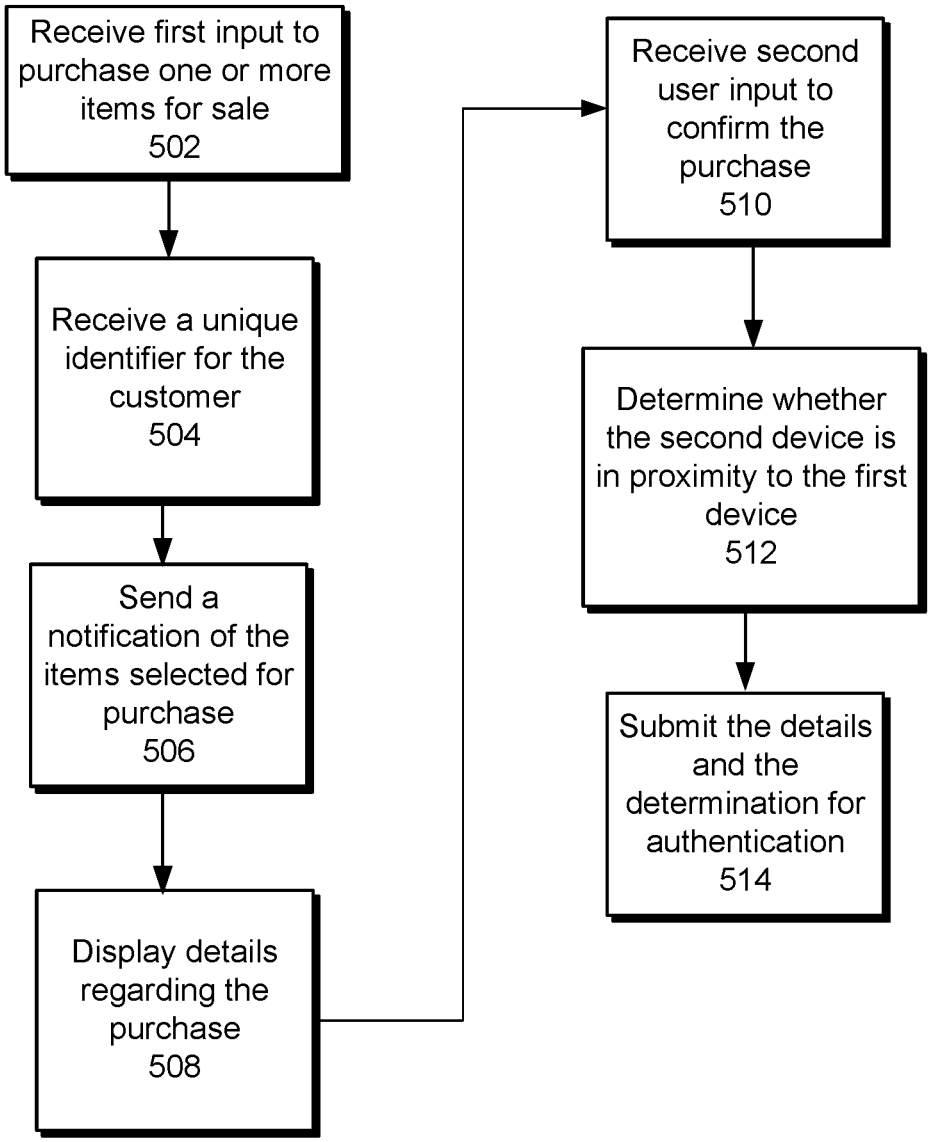
FIG. 5 is a flow chart of another example process of verifying proximity when conducting a transaction using the first device and the second device.

FIG. 5 is a flow chart of another example process 500 of verifying proximity when conducting a transaction using the first device and the second device. In some implementations, proximity between the first and second devices is not a prerequisite to completing the transaction, as described above. Instead, proximity can be considered as one factor in completing the transaction.

Similar to what is described above in reference to FIG. 2, the first device can receive first input to purchase one or more items for sale (step 502). The first device also receives a unique identifier for the customer (step 504). The first device sends, to the second device, a notification of the items selected for purchase (step 506). The second device displays details regarding the items selected for purchase (step 508). The second device receives second user input to confirm the purchase (step 510).

Then, a determination can be made, e.g., by one of the two devices or a server, as to whether the second device is in proximity to the first device (step 512). The determination can be made in the method described above in reference to FIG. 2. In some implementations, the second device determines whether it is in proximity to the first device and submits the determination along with the transaction details to a payment service system (step 514). In some other implementations, the second device submits the transaction details to the payment service system along with a location of the second device, e.g., obtained using GPS. The payment service system can determine, using the locations of the two devices, whether the first device is in proximity to the second device.

After receiving the determination, the payment service system can consider the proximity determination as a factor in determining whether to approve the transaction. For example, the payment service system can determine whether to approve transactions using a risk analysis system. The risk analysis system can weigh numerous factors, e.g., purchase history of the customer, transaction amount, a location of transaction, etc., before outputting a determination. If the second device is in proximity to the first device, the risk analysis system can determine the transaction is likely to be legitimate. That is, the risk analysis system can weigh the determination of proximity as a positive factor in approving the transaction. However, if the second device is not in proximity to the first device, the risk analysis system can approve the transaction only if certain safeguards are satisfied, e.g., the transaction amount is under a predetermined threshold or the customer has frequently purchased from the merchant. In some implementations, the risk analysis system has an increased purchase threshold if proximity was verified during the transaction. In some implementations, the risk analysis system rejects all transactions that occurred with the second device not being in proximity to the first device.

Figure 6:
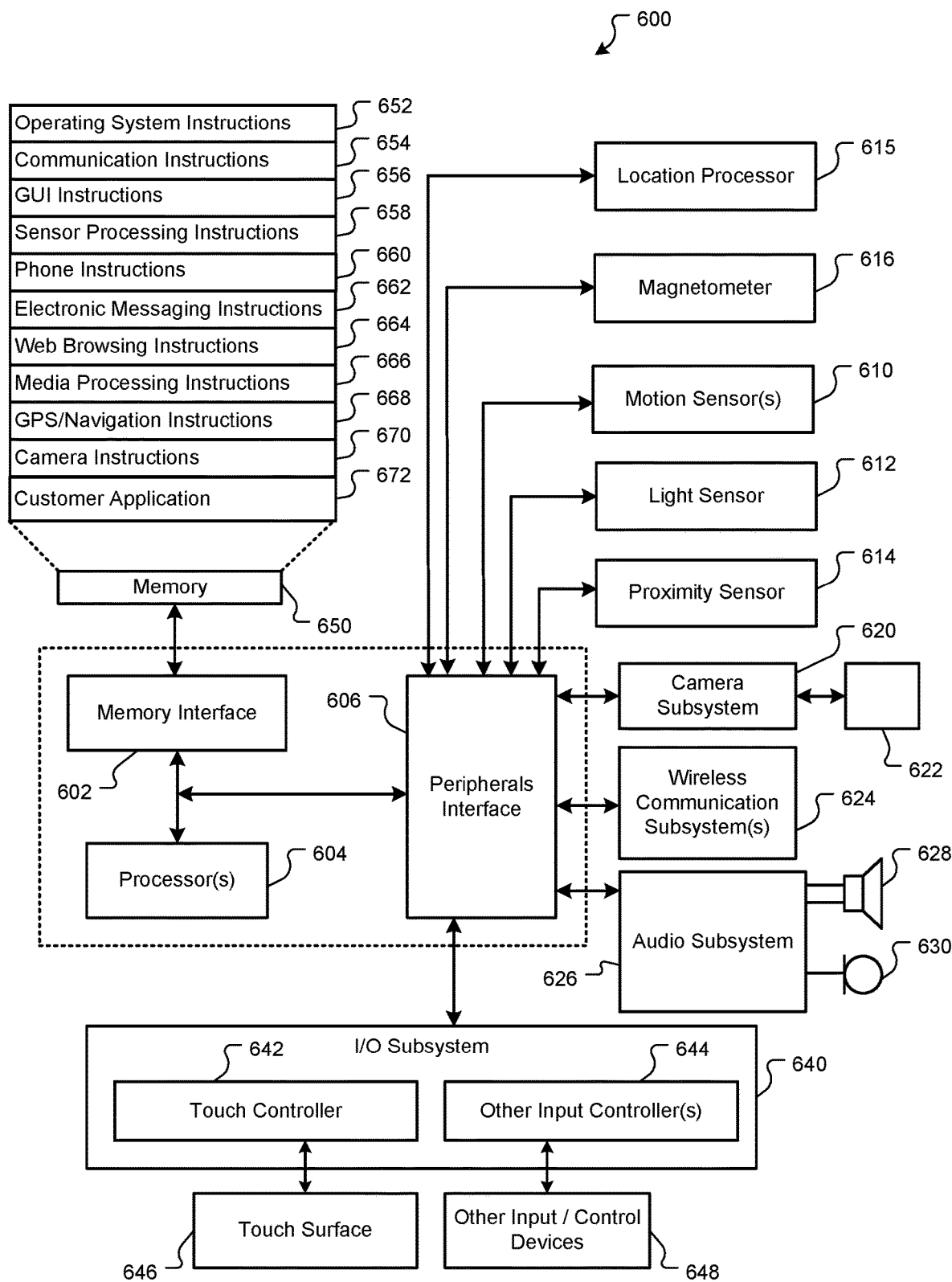
FIG. 6 is a block diagram of an exemplary architecture of a mobile device capable of running a customer application that conducts the transaction.

FIG. 6 is a block diagram of an exemplary architecture of a mobile device capable of running a customer application that conducts a transaction. Architecture 600 can be implemented in any device for generating the features described in reference to FIGS. 1-5, including but not limited to portable or desktop computers, smart phones and electronic tablets, television systems, game consoles, kiosks and the like. Architecture 600 can include memory interface 602, data processor(s), image processor(s) or central processing unit(s) 604, and peripherals interface 606. Memory interface 602, processor(s) 604 or peripherals interface 606 can be separate components or can be integrated in one or more integrated circuits. The various components can be coupled by one or more communication buses or signal lines.

Sensors, devices, and subsystems can be coupled to peripherals interface 606 to facilitate multiple functionalities. For example, motion sensor 610, light sensor 612, and proximity sensor 614 can be coupled to peripherals interface 606 to facilitate orientation, lighting, and proximity functions of the device. For example, in some implementations, light sensor 612 can be utilized to facilitate adjusting the brightness of touch surface 646. In some implementations, motion sensor 610 (e.g., an accelerometer, gyros) can be utilized to detect movement and orientation of the device. Accordingly, display objects or media can be presented according to a detected orientation (e.g., portrait or landscape).

Other sensors can also be connected to peripherals interface 606, such as a temperature sensor, a biometric sensor, or other sensing device, to facilitate related functionalities.

Location processor 615 (e.g., GPS receiver) can be connected to peripherals interface 606 to provide geo-positioning. Electronic magnetometer 616 (e.g., an integrated circuit chip) can also be connected to peripherals interface 606 to provide data that can be used to determine the direction of magnetic North. Thus, electronic magnetometer 616 can be used as an electronic compass.

Camera subsystem 620 and an optical sensor 622, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 624. Communication subsystem(s) 624 can include one or more wireless communication subsystems. Wireless communication subsystems 624 can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The specific design and implementation of the communication subsystem 624 can depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., WiFi, WiMax, or 3G networks), code division multiple access (CDMA) networks, and a Bluetooth™ network. Communication subsystems 624 may include hosting protocols such that the device may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 626 can be coupled to a speaker 628 and one or more microphones 630 to facilitate voice-enabled functions, such as voice recognition, voice replication, digital recording, and telephony functions.

I/O subsystem 640 can include touch controller 642 and/or other input controller(s) 644. Touch controller 642 can be coupled to a touch surface 646. Touch surface 646 and touch controller 642 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 646. In one implementation, touch surface 646 can display virtual or soft buttons and a virtual keyboard, which can be used as an input/output device by the user.

Other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of speaker 628 and/or microphone 630.

In some implementations, device 600 can present recorded audio and/or video files, such as MP3, AAC, and MPEG files. In some implementations, device 600 can include the functionality of an MP3 player and may include a pin connector for tethering to other devices. Other input/output and control devices can be used.

Memory interface 602 can be coupled to memory 650. Memory 650 can include high-speed random access memory or non-volatile memory, such as one or more magnetic disk storage devices, one or more optical storage devices, or flash memory (e.g., NAND, NOR). Memory 650 can store operating system 652, such as Darwin, RTXC, LINUX, UNIX, OS X, WINDOWS, or an embedded operating system such as VxWorks. Operating system 652 may include instructions for handling basic system services and for performing hardware dependent tasks. In some implementations, operating system 652 can include a kernel (e.g., UNIX kernel).

Memory 650 may also store communication instructions 654 to facilitate communicating with one or more additional devices, one or more computers or servers. Communication instructions 654 can also be used to select an operational mode or communication medium for use by the device, based on a geographic location (obtained by the GPS/Navigation instructions 668) of the device. Memory 650 may include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions and display GUIs; media processing instructions 666 to facilitate media processing-related processes and functions; GPS/Navigation instructions 668 to facilitate GPS and navigation-related processes; camera instructions 670 to facilitate camera-related processes and functions; and instructions 672 for running a customer application that conducts the transaction. The memory 650 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 650 can include additional instructions or fewer instructions. Furthermore, various functions of the mobile device may be implemented in hardware and/or in software, including in one or more signal processing and/or application specific integrated circuits.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices;

magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving, by a processor, a notification of a transaction using a first device associated with a user, wherein the notification includes an identifier that identifies both the user and a second device associated with the user;
   receiving, by the processor, from the first device, an indication of a location of the first device;
   sending, by the processor, based on the identifier included in the notification, information related to the notification to the second device to cause the second device to present a user interface that displays information about one or more items selected in the transaction;
   receiving, by the processor, from the second device, prior to authenticating the transaction, an indication of a location of the second device and an indication of a user input received via the user interface indicating a confirmation of the one or more items;
   based at least on receiving the indication of the location of the second device, determining, by the processor, that the first device is in proximity to the second device by comparing the location of the first device to the location of the second device to determine that the second device is within a predetermined distance of the first device; and
   based at least on receiving the confirmation from the second device and determining that the second device is within the predetermined distance of the first device, submitting, by the processor, to a payment processor, information related to the transaction to enable the payment processor to determine whether to approve the transaction.

2. The method as recited in claim 1, wherein receiving, by the processor, the indication of the location of the second device comprises:
   receiving, from an application executing on the second device, the indication of the location of the second device based on Global Positioning System (GPS) coordinates transmitted to the processor by the second device.

3. The method as recited in claim 2, wherein determining, by the processor, that the first device is in proximity to the second device comprises:
   comparing, by the processor, the indicated location of the first device with the GPS coordinates received from the second device to determine that the second device is within the predetermined distance of the first device.

4. The method as recited in claim 1, further comprising receiving, by the processor, from the second device, as the indication of the user input received via the user interface, an indication a user selection of a virtual control to submit payment for the one or more items.

5. The method as recited in claim 1, wherein the identifier is received via a user interface presented by an application executing on the first device.

6. The method as recited in claim 1, wherein:
   the notification includes a selection of the one or more items for purchase by the user; and
   the selection is received via a user interface presented on the first device by an application executing on the first device.

7. The method as recited in claim 1, further comprising:
receiving, by the processor, confirmation of the authentication of the transaction from the payment processor; and
sending, by the processor, to the first device and the second device, the confirmation of the authentication received from the payment processor.

8. A system comprising:
one or more processors; and
a non-transitory computer-readable medium coupled to the one or more processors and having instructions stored thereon, which, when executed by the one or more processors, cause the one or more processors to perform operations comprising:
receiving a notification of a transaction using a first device associated with a user, wherein the notification includes an identifier that identifies both the user and a second device associated with the user;
determining a location of the first device based on information received indicating the location of the first device;
sending, based on the identifier included in the notification, information related to the notification to the second device to cause the second device to present a user interface that displays information about one or more items selected in the transaction;
receiving, from the second device, prior to authenticating the transaction, an indication of a location of the second device and an indication of a user input received via the user interface indicating a confirmation of the one or more items;
based at least on receiving the indication of the location of the second device, determining that the first device is in proximity to the second device by comparing the location of the first device to the location of the second device to determine that the second device is within a predetermined distance of the first device; and
based at least on receiving the confirmation from the second device and determining that the second device is within the predetermined distance of the first device, sending, to a payment processor, information related to the transaction to enable the payment processor to determine whether to confirm authentication of the transaction.

9. The system as recited in claim 8, wherein the operation of receiving the indication of the location of the second device comprises:
receiving, from an application executing on the second device, the indication of the location of the second device based on Global Positioning System (GPS) coordinates transmitted to the one or more processors by the second device.

10. The system as recited in claim 9, wherein the operation of determining that the first device is in proximity to the second device comprises:
comparing the location of the first device with the GPS coordinates received from the second device to determine that the second device is within the predetermined distance of the first device.

11. The system as recited in claim 8, the operations further comprising receiving, by the one or more processors, from the second device, as the indication of the user input received via the user interface, an indication a user selection of a virtual control to submit payment for the one or more items.

12. The system as recited in claim 8, wherein the identifier is received via a user interface presented by an application executing on the first device.

13. The system as recited in claim 8, wherein:
the notification includes a selection of the one or more items for purchase by the user; and
the selection is received via a user interface presented on the first device by an application executing on the first device.

14. The system as recited in claim 8, the operations further comprising:
receiving confirmation of the authentication of the transaction from the payment processor; and
sending, to the first device and the second device, the confirmation of the authentication received from the payment processor.

15. A method comprising:
receiving, by one or more processors, a notification of a transaction using a first application executing on a first device associated with a user, wherein the notification includes an identifier that identifies a second device associated with the user participating in the transaction;
determining, by the one or more processors, a location of the first device based on information received indicating the location of the first device;
sending, by the one or more processors, to the second device, based on the received identifier, an indication of the transaction to cause the second device to present a user interface that displays information about one or more items selected in the transaction;
receiving, by the one or more processors, from a second application executing on the second device, prior to authenticating the transaction, in response to the indication of the transaction, an indication of a location of the second device and an indication, received via the user interface, of confirmation of the one or more items;
based at least on receiving the indication of the location of the second device, determining, by the one or more processors, that the second device is in proximity to the first device by comparing the location of the first device and the location of the second device to determine that the second device is within a predetermined distance of the first device; and
based at least on receiving the confirmation from the second device and determining that the second device is within the predetermined distance of the first device, sending, by the one or more processors, to a payment processor, transaction information to enable the payment processor to determine whether to authenticate the transaction.

16. The method as recited in claim 15, wherein receiving, from the second application executing on the second device, the indication of the location of the second device comprises:
receiving the indication of the location of the second device based on Global Positioning System (GPS) coordinates transmitted to the one or more processors by the second device.

17. The method as recited in claim 15, further comprising:
receiving the indication of the location of the second device in a first communication from the second device;
based on determining the second device is within the proximity to the first device, sending, by the one or more processors, to the second application on the second device, one or more details related to the transaction; and receiving, by the one or more processors, in a second communication from the second device, the indication of the confirmation of the transaction.

18. The method as recited in claim 15, wherein the identifier is received via a first user interface presented by the first application on the first device.

19. The method as recited in claim 15, wherein:
the notification includes a selection of the one or more items for purchase by the user; and
the selection is received via a user interface presented on the first device by the first application executing on the first device.

20. The method as recited in claim 15, further comprising:
receiving, by the one or more processors, confirmation of the authentication of the transaction from the payment processor; and
sending, by the one or more processors, to both the first device and the second device, the confirmation of the authentication received from the payment processor.

* * * * *